United States Patent [19]

Tucker

[11] 3,997,464
[45] Dec. 14, 1976

[54] PLASTIC LENSES FOR GLASS MELTERS

[75] Inventor: Robert Jerome Tucker, Hackettstown, N.J.

[73] Assignee: American Cyanamid Company, Stamford, Conn.

[22] Filed: May 15, 1975

[21] Appl. No.: 577,973

[52] U.S. Cl. .............................. 252/300; 260/314.5
[51] Int. Cl.² .......................................... F21V 9/00
[58] Field of Search ................ 252/300; 260/314.5; 8/1 XA

[56] References Cited

UNITED STATES PATENTS

| | | | |
|---|---|---|---|
| 3,138,611 | 6/1964 | Zickendraht et al. | 260/314.5 |
| 3,291,746 | 12/1976 | Donoian et al. | 252/300 |
| 3,365,463 | 1/1968 | Groll et al. | 260/314.5 |
| 3,382,183 | 5/1968 | Donoian et al. | 252/300 |
| 3,853,783 | 12/1974 | Tucker | 252/300 |

OTHER PUBLICATIONS

Stair; Ralph "Spectral–Transmissive Properties and Use of Eye–Protective Glasses" Nat'l. Bureau of Standards, Circular 471, pp. 9–10.

*Primary Examiner*—Benjamin R. Padgett
*Assistant Examiner*—Deborah L. Kyle
*Attorney, Agent, or Firm*—John L. Sullivan

[57] ABSTRACT

A plastic composition suitable for use in devices to protect glass workers from the eye-damaging light given off by molten glass is disclosed.

3 Claims, No Drawings

PLASTIC LENSES FOR GLASS MELTERS

This invention relates to a method for protecting glass workers from eye damage caused by the extremely bright radiation emitted by molten glass. More specifically, it relates to a plastic composition which absorbs all the damaging radiation emitted by molten glass and which can be formed into protective goggles for use by glass melters.

Glass workers have for many years worn protective goggles to absorb the intense yellow sodium radiation emitted by molten glass. Ideally, such goggles should absorb not only the sodium radiation, but also the highly damaging ambient ultraviolet radiation as well. This is particularly important for glass melters who work with the hottest and therefore brightest part of the glassmaking process. In addition, glass melter's goggles should allow some visible light transmission so that the wearer may judge the color of the molten glass. Unfortunately, currently available goggles, often called Melter's Blue Glasses, do not function ideally and do not fully protect the workers who wear them. While these goggles do absorb the intense sodium lines of the spectrum, they fail to absorb significant amounts of ultraviolet radiation. The National Bureau of Standards noted this problem in Circular 471, (page 14) and stated that there is "a need for a special specification on Melters Blue glasses for furnace work. Until such is available, all operators should be cautioned against prolonged use of the present blue glasses."

In addition to offering poor protection, the currently available blue lenses have other disadvantages as well. The blue lenses used in these glasses are made of specialty glass which is not "poured" frequently. Consequently, the glass is often unavailable and the lenses sometimes vary in optical quality. Finally, the glass lenses are thick and heavy and do not permit flexibility in the design of the protective goggles.

It is a major object of the present invention to provide a plastic material which will be convenient to use and offer protection from both ultraviolet and sodium radiation. Additional objects and advantages of the invention will become obvious from the description and claims set forth hereinbelow.

In accordance with the present invention, it has been found that a plastic material suitable for optical uses can be mixed with a combination of organic dyes and an ultraviolet absorber to create a material which has the light absorbing properties desired for glass melters glasses. While cellulose propionate is the preferred plastic for use in the present invention, one may use any plastic material suitable for use as lens material, such as cellulose acetate, cellulose butyrate, polycarbonates, polyvinyl chloride, polyterephthalates, polymethyl methacrylate and the like.

To provide reasonable protection for a glass melter, preferably the finished product does not transmit more than 1% of the light in the blue region of the spectrum (wave-length 400 to 500 nanometers), absorbs essentially all light in the yellow region of the spectrum (wave-length 520 to 680 nanometers), and absorbs all light in the ultraviolet region (wave-length 260–380 nanometers).

For the purpose of this invention, a combination of two dyes are employed, namely, a copper phthalocyanine tri-sulfonamide in which one hydrogen atom of each amide nitrogen is replaced by a 2-ethylhexyloxypropyl radical (available commercially as Calco Oil Blue FLP), and 4-hydroxy-1-(p-toluidino)-9,10-anthraquinone (C.I. Solvent Violet 13, C. I. 60725), having the structure:

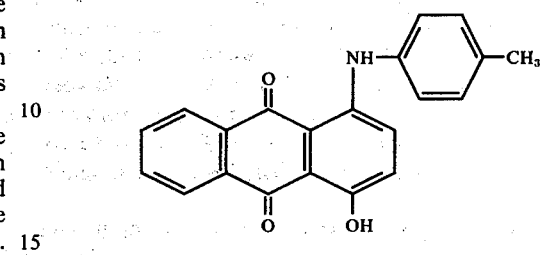

has been found to provide the desired degree of transmittance in the blue region and absorbtion in the yellow region.

The preferred UV absorber is 2,2'-dihydroxy-4-methoxybenzophenone, although any UV absorber compatible with the plastic substrate may be used, for example:

A. 2-hydroxybenzophenones: 2-hydroxy-4-methoxybenzphenone, 2,4-dihydroxybenzophenone, 2,2',4,4'-tetrahydroxybenzophenone, 2,2'-dihydroxy-4,4'-dimethoxybenzophenone, 2-hydroxy-4-butoxybenzophenone, 2-hydroxy-4-octyloxybenzophenone, 2-hydroxy-4-dodecyloxybenzophenone, 2,2'-dihydroxy-4-octyloxybenzophenone, and 4'-chloro-2-hydroxy-4-octyloxybenzophenone.

B. Benzotriazoles: 2-(2-hydroxy-5-methylphenyl)benzotriazole, 2-(2-hydroxy-5-octylphenyl)benzotriazole, and 2-(2-hydroxy-4-methoxyphenyl)benzotriazole.

C. Esters: Phenyl salicylate, tertiary-butylphenyl salicylate, phenyl resorcylate, p-octylphenyl benzoate, bis (p-nonylphenyl)isophthalate and, bis(p-nonylphenyl)-terephthalate.

D. Triazines: 2,4,6-tris(2-hydroxy-4-octyloxyphenyl)-s-triazine, and 2-(2-hydroxy-4-octyloxyphenyl)-4,6-dixylyl-s-triazine.

E. Benzothiazolines: 2-(4-methoxyphenylimino)-3-ethylbenzothiazoline, and 2-phenylimino-3-ethylbenzothiazoline.

F. Benzylidene-malonic esters: Diethyl p-methoxybenzylidenemalonate, diethyl o-methoxybenzylidenemalonate, diethyl p-hydrozybenzylidenemalonate, and diethyl diphenylmethylenemalonate.

G. Arylaminoethylenes: N-methyl-p-methoxyanilinomethylenemalonitriles.

H. Guanidines of the 1,2-dibenzoyl-3-arylguanidine class as exemplified by 1,2-dibenzoyl-3-(p-methoxyphenyl) guanidine, 1,2-dibenzoyl-3-(p-chlorophenyl)-guanidine, 1,2-di(p-methoxybenzoyl)-3-(p-methoxyphenyl)guanidine, and the like.

I. Aryl acrylonitrile and arylacrylic acid derivatives such as: Diphenylmethylene-cyanoacetic acid ethyl ester; diphenylmethylene-cyanoacetic acid octyl ester, and diphenylmethylene-malononitrile.

The amounts and proportion of the dyes can be changed to vary the visual transmittance from about 0.1 to 1%. Of course, the concentration of dyes required to achieve any given degree of visual transmittance varies with the thickness of plastic under consideration. The percentage concentration of the blue dye, Calco Oil Blue FLP, is such that if present in a film, said concentration multiplied by the thickness of said films in mils equals a constant falling in the range of from about 3.9 to 5.2. The percentage concentration of the Violet dye, C.I. Solvent Violet 13(C. I. 60725), is such that if present in a film, said concentration multiplied by the thickness of said film in mils equals a constant falling in the range from about 6.5 to 13. The concentration of the ultraviolet absorber can be such as to be equivalent in ultraviolet absorbance to a percentage concentration of 2,2'dihydroxy-4-methoxybenzophenone such that if present in a film, said concentration multiplied by the thickness of said film in mils equals approximately 26.

The plastic composition of the present invention can be formed into protective devices by any conventional method used in polymer processing such as injection molding, solvent casting, monomer casting, extrusion, calendering, and compression molding. The protective devices can be made in a wide variety of shapes and forms and are not as limited in design as are protective goggles made with glass lenses.

The following examples are provided for illustrative purposes and may include particular features of the invention. However, the examples should not be construed as limiting the invention, many variations of which are possible without departing from the spirit or scope thereof.

EXAMPLE 1

A medium shade lens, with a thickness of 130 mils having a visible transmittance of from 0.5–1% was prepared as follows:

0.344 grams of Calco Oil Blue FLP, 0.562 grams of C.I. Solvent Violet 13, C. I. 60725, and 2.0 grams of 2,2'-dihydroxy-4-methoxybenzophenone were mixed together, then dry blended with 1000 grams of cellulose propionate and injection molded to form the lens.

EXAMPLE 2

A dark shade lens, with a thickness of 130 mils having a visible transmittance of from 0.32 to 0.45% was prepared by mixing and molding, in the same manner as in Example 1, the following materials:

|  | Grams |
|---|---|
| Cellulose propionate | 1000 |
| Calco Oil Blue FLP | 0.358 |
| C.I.Solvent Violet 13, C.I. 60725 | 0.646 |
| 2,2'-dihydroxy-4-methoxybenzophenone | 2.0 |

EXAMPLE 3

An extra dark lens, with a thickness of 130 mils, having a visible transmittance of from 0.11–0.2% was prepared by mixing and molding, in the same manner as Example 1, the following materials:

|  | Grams |
|---|---|
| Cellulose propionate | 1000 |
| Calco Oil Blue FLP | 0.372 |
| C.I. Solvent Violet 13, C.I. 60725 | 0.990 |
| 2,2'-dihydroxy-4-methoxybenzophenone | 2.0 |

I claim:
1. An optical lens comprising a plastic material transmissive to visible light having incorporated therein (1) a copper phthalocyanine trisulfonamide compound in which one hydrogen atom of each amide nitrogen is replaced by a 2-ethylhexloxypropyl radical, (2) the compound 1-hydroxy-4-(p-toluidino)-9,10-anthraquinone and (3) an ultraviolet absorber compound; said copper phthalocyanine trisulfonamide being present in a weight percentage concentration such that multiplied by the thickness of the lens in mils it equals a constant falling within the range of 3.9 to 5.2; said 1-hydroxy-4-(p-toluidino)-9,10-anthraquinone compound being present in a weight percentage concentration such that multiplied by the thickness of the lens in mils it equals a constant falling within the range of 6.5 to 13; and said ultraviolet absorber compound being present in a weight percentage concentration such that multiplied by the thickness of the lens in mils it equals approximately 26.

2. An optical lens according to claim 1 in which the ultraviolet light absorber compound is 2,2'-dihydroxy-4-methoxybenzophenone.

3. An optical lens according to claim 1 wherein the plastic material is cellulose propionate.

* * * * *